Dec. 6, 1932.　　C. V. GARDNER　　1,889,857
MASTER CYLINDER PISTON
Filed May 6, 1931
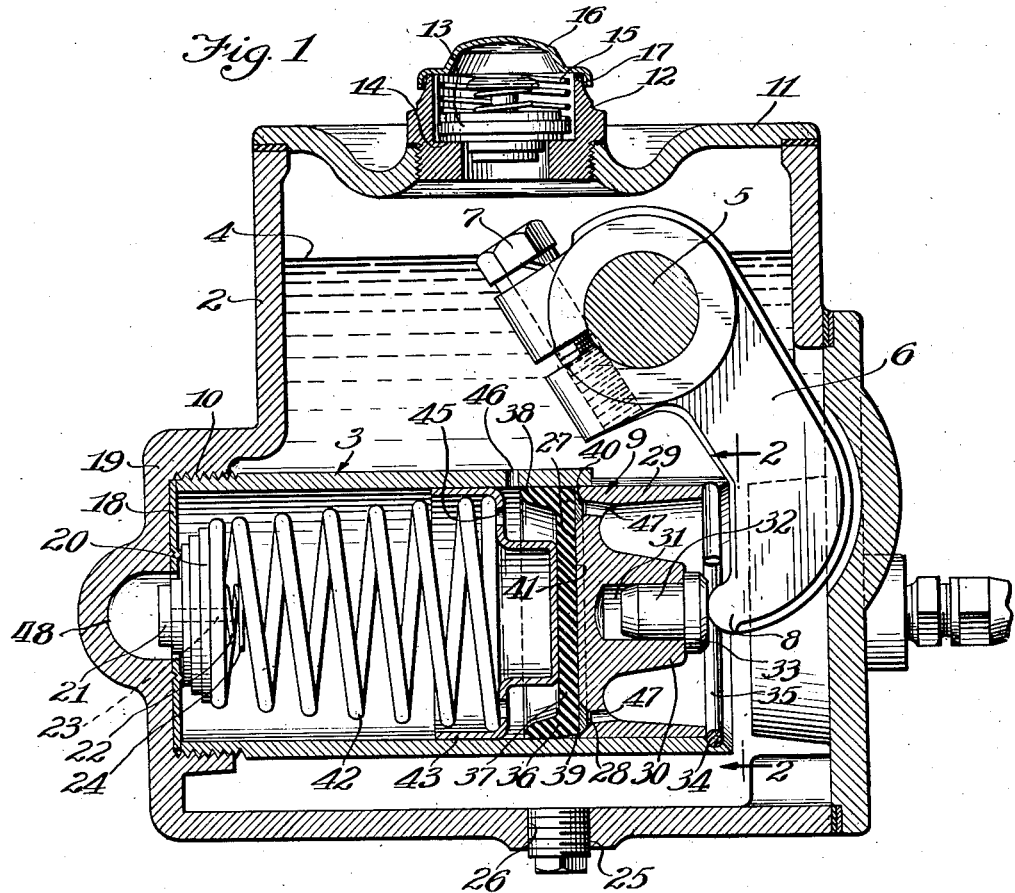
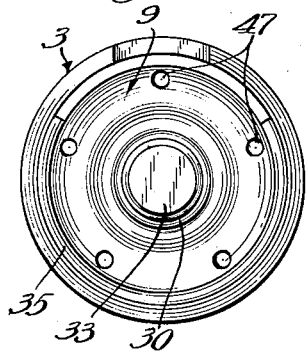
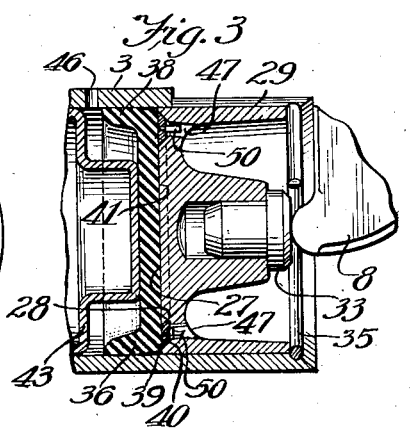
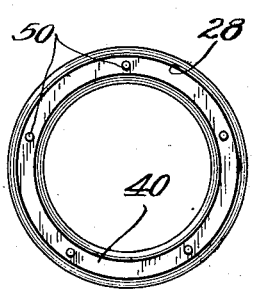
Inventor:
Clarence V. Gardner Patented Dec. 6, 1932

1,889,857

UNITED STATES PATENT OFFICE

CLARENCE V. GARDNER, OF DETROIT, MICHIGAN, ASSIGNOR TO HYDRAULIC BRAKE COMPANY, OF DETROIT, MICHIGAN, A CORPORATION OF CALIFORNIA

MASTER CYLINDER PISTON

Application filed May 6, 1931. Serial No. 535,316.

My invention pertains to piston construction and is particularly adapted to be incorporated in the master cylinder piston of hydraulic brake systems, although it is equally capable of use in other mechanisms.

In a hydraulic braking system such as illustrated in an application of Malcom Loughead, Serial No. 304,195, filed September 6, 1928, the master cylinder piston is arranged with a series of holes extending therethrough to provide bleed passages for fluid from the rear of the piston upon the retractile movement of the same. The packing cup associated with the piston is firmly seated against the same during the protractile or pressure stroke of the piston. There is a likelihood, particularly under high braking pressure, of the packing cup material being forced into these holes which form the bleed passages, which would hinder the proper passage of fluid therethrough and in extreme cases cause the ruination of the packing cup. To obviate this condition I have devised a novel means for protecting the packing cup, and an object of my invention is the provision of an improved master cylinder piston.

Another object of my invention is the provision of a master cylinder having a master piston and its associated packing cup and in which movable means seated in the forward face of the piston prevents direct contactual engagement with the portion of the packing cup and that portion of the piston adjacent the bleed passages extending therethrough.

Another object of my invention is the provision of a master piston arranged with a series of holes extending therethrough which merge with an annular groove in the forward face of the piston, and of movable means seated in said groove to provide a substantially flat continuous face for said piston against which the packing cup associated with the piston is seated during the pressure stroke of the same.

Another object of the invention is the provision of an annular groove in the forward face of the piston and into which the bleed passages of the piston terminate, in combination with a ring member seated therein to cover the passages when the piston is in its retracted position or during the pressure stroke of the same to provide a substantially flat surface against which the packing cup associated with the piston seats, and the formation of the groove and ring member of V-shaped cross section, whereby the ring after having been moved to uncover the passages during the retractile movement of the piston to permit the flow of fluid therethrough, is assured a positive reseating in the groove subsequent to each complete retractile movement of the piston to again cover the passages.

The above objects, as well as others not particularly pointed out, will appear in the following description in reference with the accompanying drawing in which like reference characters in the several views denote like parts and in which—

Fig. 1 is a longitudinal section taken through the reservoir and the master cylinder which contains the improved master piston of my invention;

Fig. 2 is a sectional view along the line 2—2 of Fig. 1 looking in the direction of the arrows indicated thereon;

Fig. 3 is a fragmentary sectional view of the piston end of the master cylinder illustrating a modified form of master piston; and Fig. 4 is an end view of the modified form of piston illustrated in Fig. 3.

Referring to the drawing, and particularly to Figs. 1 and 2, the housing 2 containing the master cylinder 3 with which the master cylinder piston of my invention is associated, is suitably attached to the frame of an automobile and constitutes a reservoir which under normal conditions stands full of liquid to about the level indicated at 4.

An operating shaft 5 is journaled in the opposite walls of the housing 2 and carries an external lever which is linked to the foot brake pedal of the automobile (not shown). The lever 6 is rigidly secured to the shaft 5 by a bolt 7 within the housing 2 and has a hook shaped end 8 serving to transfer the rotary motion of the shaft 5 to the piston indicated generally by the reference character 9 and operating within the master cylinder 3. The master cylinder 3 has threaded engagement at 10 with one end of the housing and is thereby rigidly held in place in a horizontal position. The housing or reservoir 2 is provided with a cover 11 which supports a filling cap 12 and comprises a double acting valve 13 which is yieldingly held on the shoulder 14 by means of a coil spring 15 which engages a plate 16 fixed on the upper edge 17 of the filling cap wall.

A valve seat 18, held in position between the end of the master cylinder 3 and the side 19 of the reservoir 2, co-operates with a double acting valve 20 having a passageway therethrough which is normally closed by a second valve 21. The valve 21 is held in place by a spring 22 which exerts a pressure longitudinally on a pin 23 through the medium of its head 24. As the double acting valve 20 forms no part of my invention, a detailed description of its operation will not be given; suffice to say that it is actuated by movement of the piston 9 in the master cylinders of the brakes and to control the flow of brake fluid from and to the master cylinder 3 upon the compression and suction strokes of the piston mounted therein. A suitable drain plug 25 is provided in a tapped opening 26 in the bottom of the reservoir 2 for permitting the same to be drained from time to time as required.

The end face 27 of the forward portion or head of the piston 9 is provided with an annular V-shaped groove 28 near its peripheral edge, a flange 29 extending rearwardly from its head and a centrally located rearwardly extending lug 30. The lug 30 is provided with a central bore 31 in which is fitted a wear piece or stud 32 provided with a head 33 at its outer end and is adapted to be engaged by the hooked end 8 of the actuating lever 6. The free or piston end of the master cylinder 3 is provided with an annular groove 34 in which is fitted a split spring retaining member 35 adapted to be engaged by the annular end of the flange 29 of the master piston 9 when in its normal postion.

A rubber packing cup 36 is associated with the master piston 9 and comprises a flat disc-shaped portion 37 provided with a peripheral flange 38 extending axially from the disc-shaped portion 37. The cup 36 has a base diameter somewhat smaller than the inner diameter of the cylinder, which leaves a small annular space 39 about the base, although this space or resulting looseness is not essential for the successful operation of my invention. A metal ring 40, frusto-conical in cross section and having its inner and outer peripheral faces complementary to the walls of the V-shaped annular groove 28, is normally seated therein and provides the end face 27 with a substantially smooth face which is engaged by the face 41 of the packing cup 36. The packing cup 36 and metal ring 40 are urged into the position illustrated in Fig. 1, with the ring 40 seated in the annular V-shaped groove 28 and the face 41 of the packing cup 36 in contactual engagement with the end face 27 of the piston 9, by a retractile spring 42. The retractile spring 42 has its one end bearing against a cup shaped spring retainer 43 which in turn bears against the packing cup 36 and receives and holds this end of the spring 42 in position. The opposite end of the spring 42 bears against the valve 20 to normally retain the valve 20 in contact with seat 18. The spring 42 also maintains the piston 9 in its normal retracted position having its flange end engaging the retaining member or stop 35. The retainer 43 is provided with a plurality of openings 45 for the passage of brake fluid past the retainer 44.

The master cylinder 3 is provided with an opening 46 which communicates with the interior of the cylinder 3 immediately forward of the inner end of the packing cup 36 which permits brake fluid from the reservoir 2 to pass directly into or out of the master cylinder 3 when the piston 9 is in its normal or retracted position as illustrated in Fig. 1. The ring member 40 is seated in the V-shaped annular groove 28 when the piston 9 is in its retracted position or during its forward or pressure stroke and covers or closes a plurality of bleed passages 47 extending through the head of the piston 9 from the rear side of the same and which merge with the V-shaped annular groove 28. These bleed passages 47, upon the return movement of the master piston 9 under the influence of the retractile spring 42, are uncovered due to the unseating of the metal ring 40 from the V-shaped annular groove 28 permitting brake fluid to pass through these bleed passages 47 from the rear of the piston 9 and by the peripheral flange 38 of the packing cup 36 as will presently be described.

In the operation of the apparatus thus described the movement of the master piston 9 into the master cylinder 3 under the influence of the lever 6 causes a fluid pressure in the master cylinder 3 to unseat the valve 21 and permits fluid under pressure to pass through the outlet 48 into the brake system. The pressure in the master cylinder 3 forces the peripheral flange 38 of the packing cup 36 firmly into engagement with the cylindrical wall of the master cylinder 3 so that no fluid can escape past the packing cup 36 during the protractile movement of the piston 9. Upon the forward movement of the piston 9 the metal ring 40 is maintained seated in the V-shaped annular groove 28. The ring 40 as before described is frusto-conical in cross section with its inner and outer peripheral faces complementary to the walls of the V-shaped groove 28 to provide the forward end of the piston 9 with a substantially flat continuous end face 27 against which the face of the packing cup 36 is forced under the influence of the fluid pressure in the cylinder 3 which prevents cutting of the packing cup 36 by the peripheral edge of the V-shaped groove 28.

Upon the return movement of the piston 9 under the influence of the spring 42, the fluid pressure within the cylinder 3 will decrease on account of the check valve 20 which retards the return flow of fluid from the system into the cylinder. The reduced pressure in the cylinder 3 is also aided by a partial vacuum created in the cylinder as the spring 42 forces the piston 9 to its retracted or normal position. The fluid pressure to the rear of the piston 9, which remains the same, becomes greater than the fluid pressure in the master cylinder 3 during the retractile movement of the piston, allowing fluid pressure acting through the bleed passages 47 to move the metal ring 40 from its seat in the V-shaped annular groove 28. This movement of the metal ring 40 also unseats the packing cup 36 from the end face 27 of the piston 9 and the fluid flowing through the bleed passages 47 from the reservoir 2 passes around the base of the packing cup 36 into the master cylinder 3. The small annular space 39 about the base of the packing cup 36 resulting from a slightly reduced diameter of the base portion facilitates the passage of fluid past the packing cup 36 and as the flange 38 of the same is flexible it is flexed inwardly to unseat the flange from engagement with the wall of the cylinder 3.

In this manner at the end of the retractile movement of the piston 9 there is a greater quantity of fluid in the cylinder 3 and in the system than is necessary for the operation of the same, and the continued flow of fluid from the system as the wheel cylinder pistons of the wheel brakes move to their retractile position, will cause all excess fluid in the cylinder 3 to pass up through the small passage 46 in the cylinder wall to the reservoir 2. When the piston 9 is in its fully retracted position and the fluid pressure in the master cylinder 3 and reservoir 2 are equal, the spring 42 again forces the packing cup 36 against the end face 27 of the piston 9 and also moves the metal ring 40 into the annular groove 28 to again seat the same therein to close the bleed passages 47.

Should the annular metal ring 40 be forced out of the annular V-shaped groove by the flow of fluid through the bleed passages 47 during the retractile movement of the piston 9, the ring 40 will assume a position slightly eccentric relative to the groove 28, with its bottom peripheral edge engaging the bottom of the inner wall of the cylinder 3 due to the fact that the diameter of the ring 40 is slightly less than that of the piston 9 as before pointed out. When the piston 9 is fully retracted and the fluid pressures in the cylinder 3 and reservoir 2 are again equal, the spring 42 acts to force the cup 36 and ring 40 rearwardly. This rearward movement of the ring 40 places the respective bottom and upper portions of the outer and inner peripheral faces of the ring 40 in parallel relation with the bottom and upper portions of the respective outer and inner faces of the groove 28 due to the slightly eccentric position it assumes when forced out of the annular groove 28. Continued movement of the ring 40 under the influence of the spring 42 causes these respective faces of the groove 28 to cam the ring 40 to again seat the same in the groove 28 to cover or close the bleed passages 47.

The bleed passages 47 extending through the piston 9 merge with the annular groove 28 in the same and are covered by the metal ring 40 seated in the groove 28. Thus at no time are these passages 47 covered by the packing cup 36 which eliminates the possibility of forcing of the cup material into the bleeder passages 47 during the protractile or pressure stroke of the piston 9.

In the modification illustrated in Fig. 3 the piston end of the master cylinder 3 is shown. The metal ring 40 as shown is provided with pin members 50 secured thereto in any suitable manner and extend into the bleed passages 47 a distance greater than the maximum distance through which the ring 40 may move when unseated by the flow of fluid through the passages 47. These pins 50 hold the metal ring loosely in position to permit free movement of the ring during the retractile movement of the piston and prevent the ring from assuming an eccentric position relative to the piston should the ring be forced out of the groove as previously described.

While I have illustrated and described my invention for a particular use, it is to be understood that the piston of my invention is applicable for other uses, and changes and modifications may be made, but I aim to cover all such changes as come within the spirit and scope of the appended claims.

I claim:
1. In a hydraulic brake mechanism including a master cylinder, a piston reciprocable therein, a packing cup engaging the forward face of said piston, an annular groove in the forward face of said piston, passages extending through said piston and merging with said groove, and a movable member seated in said groove to provide a continuous flat contacting surface for said cup during the pressure stroke of said piston.

2. In a hydraulic brake mechanism including a master cylinder, a piston reciprocable therein, a packing cup engaging the forward face of said piston, an annular groove in said face, bleed passages extending through said piston and merging with said groove, and a movable ring seated in said groove to cover said passages and provide a continuous flat contacting surface for said cup during the pressure stroke of said piston.

3. In a hydraulic brake mechanism including a master cylinder, a piston reciprocable therein, a packing cup engaging the forward face of said piston, a fluid supply in communication with the rear of said piston, passages extending through said piston, an annular groove in the forward face of said piston merging with said passages, and a ring seated in said groove to provide a continuous flat surface for said cup during the protractile stroke of said piston and movable relative to said piston during the retractile stroke thereof to permit fluid to flow through said passages and past said cup.

4. In a hydraulic brake mechanism, the combination of a master cylinder including a piston reciprocable therein, a packing cup engaging the forward face of said piston, a fluid supply to the rear of said piston, bleed passages extending through said piston, an annular groove in the piston face communicating with said passages, and a ring member seated in said groove and movable with said piston during the protractile stroke of the same to prevent said cup engaging said piston around the region of said groove.

5. In a hydraulic brake mechanism, the combination of a master cylinder and a piston movable therein, fluid passages for said piston, a fluid supply to the rear of said piston, an annular V-shaped groove in the forward face of said piston communicating with said passages, a ring member seated in said groove and a packing cup engaging said piston face and said ring member during the protractile stroke of said piston, said cup and ring movable relative to said piston during the retractile movement of said piston to permit the uncovering of said passages to allow fluid to pass forwardly of said cup, and means for again moving said ring in seating engagement with said groove and said cup against said piston face and said ring.

6. In a hydraulic braking mechanism, the combination of a master cylinder and a piston movable therein, fluid passages extending through said piston, a fluid supply to the rear of said piston, an annular V-shaped groove in the forward face of said piston communicating with said passages, a ring member of complementary formation to said groove normally seated in said groove, a packing cup engaging said piston face and said ring during the protractile stroke of said piston and movable with said cup relative to said piston during the retractile stroke of said piston to uncover said passages and allow fluid to flow forwardly past said cup, and means for seating said ring in said groove and said cup against said piston face and ring at the completion of said retractile stroke.

7. In a hydraulic braking mechanism, the combination of a master cylinder and a piston movable therein, fluid passages extending through said piston, a fluid to the rear of said piston, an annular V-shaped groove in the forward face of said piston communicating with said passages, a ring member of complementary formation to said groove seated therein, and a packing cup engaging said piston face and said ring during the protractile stroke of the piston and movable with said cup relative to said piston during its retractile stroke to permit fluid to flow forwardly past said cup, said groove providing camming means for concentrically seating said ring in said groove upon return from its forward movement.

8. In a hydraulic brake mechanism, the combination of a master cylinder and a piston movable therein, fluid passages extending through said piston, a fluid supply to the rear of said piston, an annular V-shaped groove in the forward face of said piston and communicating with said passages, a ring member of complementary formation to said groove seated therein, and a packing cup engaging said piston face and said ring during the protractile stroke of said piston and movable with said cup relative to said piston during its retractile stroke, said groove providing camming means for concentrically seating said ring in said groove under the influence of a spring means acting upon the completion of the full retractile movement of said piston.

9. In a hydraulic brake mechanism including a master cylinder, a piston movable therein, passages extending through said piston, an annular groove in the forward face of said piston communicating with said passages, a ring member movably seated in said groove, a packing cup forward of said piston engaging said piston face and said ring to firmly seat said ring in said groove during the protractile stroke of said piston, said cup and ring movable relative to said piston during the retractile stroke of the same to uncover said passages, and means on said ring cooperating with said passages to guide said ring during its movement relative to said piston.

10. In a hydraulic brake mechanism including a master cylinder, a piston movable therein, passages extending through said piston, an annular groove in the forward face of said piston communicating with said passages, a ring member movably seated in said groove, a packing cup forward of said piston engaging said piston face and said ring to firmly seat said ring in said groove during the protractile stroke of said piston, said cup and ring movable relative to said piston during the retractile stroke of the same to uncover said passages, and pin members on said ring projecting into said passages to guide said ring during its movement relative to said piston and its return to seating position upon the full retractile movement of said piston.

11. Fluid pressure apparatus comprising a cylinder, a piston reciprocable therein, a packing member engaging the forward face of said piston, passages extending through said piston, and a movable member for closing said passages and providing a continuous flat surface for said packing member.

12. In fluid pressure apparatus, a cylinder, a piston reciprocable therein, a packing member engaging the forward face of said piston, passages extending through said piston and communicating with a fluid containing chamber, an annular groove in the forward face of said piston merging with said passages, and a ring seated in said groove to provide a continuous flat surface for said member during the protractile stroke of said piston, said ring movable relative to said piston during the retractile stroke thereof to permit fluid to flow through said passages.

13. A piston having a face provided with a depression therein, passages through said piston communicating with said depression, and a movable member adapted to rest in said depression in one of its positions, thereby providing a smooth continuous face for said piston.

14. A piston having a face provided with a depression therein, passages through said piston communicating with said depression, a movable member adapted to rest in said depression in one of its positions, thereby providing a smooth continuous face for said piston, and pins on said member.

In witness whereof, I hereunto subscribe my name this 1st day of May, 1931.

CLARENCE V. GARDNER.